(12) United States Patent
Cascia

(10) Patent No.: US 8,087,393 B2
(45) Date of Patent: Jan. 3, 2012

(54) ZERO FLOAT VALVE FOR INTERNAL COMBUSTION ENGINE AND METHOD OF OPERATION THEREOF

(75) Inventor: Leonard Cascia, Ridgewood, NY (US)

(73) Assignee: Arrow Leads, Inc., Ridgewood, NY (US)

( * ) Notice: Subject to any disclaimer, the term of this patent is extended or adjusted under 35 U.S.C. 154(b) by 882 days.

(21) Appl. No.: 12/152,761

(22) Filed: May 16, 2008

(65) Prior Publication Data

US 2009/0288630 A1    Nov. 26, 2009

Related U.S. Application Data

(60) Provisional application No. 60/930,821, filed on May 18, 2007.

(51) Int. Cl.
*F01L 5/00* (2006.01)

(52) U.S. Cl. ............ 123/188.4; 123/364; 123/189; 123/188.13; 123/190.2; 123/190.5; 123/190.4; 123/188.5; 123/188.16; 123/188.2

(58) Field of Classification Search .......... 123/188.1, 123/189, 188.14, 188.4, 188.15, 188.2, 188.16, 123/188.5, 190.1, 190.12, 190.3, 190.4, 190.5, 123/190.6, 190.7, 190.15, 190.2, 188.13, 123/188.17
See application file for complete search history.

(56) References Cited

U.S. PATENT DOCUMENTS

| | | |
|---|---|---|
| 1,123,986 A | 1/1915 | Bowman |
| 1,161,223 A | 11/1915 | Koken |
| 1,273,002 A | 7/1918 | Samuels |
| 1,303,748 A | 5/1919 | Wattel |
| 1,332,265 A | 3/1920 | Lehman |
| 1,537,248 A | 5/1925 | Maloney |
| 1,599,430 A | 9/1926 | Ofeldt |
| 1,612,550 A | 12/1926 | Tom |
| 1,798,956 A | 3/1931 | Shutts |
| 1,818,527 A | 8/1931 | Becker |
| 1,922,678 A | 8/1933 | Hallet |
| 2,201,292 A | 5/1940 | Hickey |
| 2,296,081 A | 9/1942 | Aspin |
| 2,364,040 A | 11/1942 | Grube |
| 2,409,350 A | 3/1946 | Forrest |
| 2,741,931 A | 4/1956 | Sills |
| 3,198,181 A | 8/1965 | Dolphin |
| 3,896,781 A | 7/1975 | Smith |
| 3,948,227 A * | 4/1976 | Guenther ................ 123/258 |
| 4,342,294 A | 8/1982 | Hopkins |
| 4,763,615 A | 8/1988 | Frost |
| 4,765,287 A | 8/1988 | Taylor |

(Continued)

*Primary Examiner* — Michael Cuff
*Assistant Examiner* — Long T Tran
(74) *Attorney, Agent, or Firm* — Dilworth & Barrese, LLP.

(57) ABSTRACT

A valve apparatus for an internal combustion engine, the valve apparatus including: a main part having a wall section defining a valve cavity extending along a longitudinal length of the main part and an opening located in the wall section of the main part, the opening flow connected to the combustion chamber; an outer part configured and arranged so as to be reciprocally located in the valve cavity, the outer part having a wall section defining an inner passage extending along a longitudinal axis thereof; an inner part having a first end situated outside of the cavity and a second end situated within the cavity and the inner passage of the outer part, the inner part having a wall section defining an inner passage, a first opening at the first end, and one or more openings in that part of the walled section which is situated within the cavity.

16 Claims, 11 Drawing Sheets

U.S. PATENT DOCUMENTS

| | | |
|---|---|---|
| 4,815,421 A | 3/1989 | Paul |
| 4,911,115 A | 3/1990 | Boyesen |
| 4,976,227 A | 12/1990 | Draper |
| 5,388,552 A * | 2/1995 | Sugimoto et al. .......... 123/90.16 |
| 5,454,357 A * | 10/1995 | Elder ........................... 123/337 |
| 5,542,385 A | 8/1996 | Kim |
| 5,596,966 A * | 1/1997 | Elder ........................... 123/337 |
| 5,655,494 A | 8/1997 | Donaldson |
| 5,694,890 A | 12/1997 | Yazdi |
| 5,740,771 A | 4/1998 | Sebastian |
| 5,878,707 A | 3/1999 | Ballard |
| 5,941,206 A * | 8/1999 | Smith et al. ................ 123/190.4 |
| 5,967,108 A | 10/1999 | Kutlucinar |
| 6,105,542 A | 8/2000 | Efford |
| 6,257,191 B1 | 7/2001 | Kutucinar |
| 6,308,677 B1 * | 10/2001 | Bohach et al. ............. 123/190.1 |
| 6,443,116 B1 | 9/2002 | Dahlborg |
| 6,619,250 B2 | 9/2003 | Folino |
| 6,666,197 B2 | 12/2003 | Bayer |
| 6,763,790 B2 | 7/2004 | Watson |
| 6,874,456 B2 * | 4/2005 | Yamada et al. ............. 123/90.36 |
| 7,051,691 B2 | 5/2006 | Battlogg |
| 7,263,963 B2 * | 9/2007 | Price .......................... 123/188.4 |
| 2004/0226535 A1 * | 11/2004 | Sakai ............................ 123/308 |
| 2004/0226536 A1 * | 11/2004 | Sakai et al. .................... 123/308 |
| 2005/0205028 A1 | 9/2005 | Lewis |
| 2007/0067988 A1 | 3/2007 | Price |
| 2007/0199543 A1 * | 8/2007 | Inui ............................... 123/432 |

* cited by examiner

ZERO FLOAT VALVE FOR INTERNAL COMBUSTION ENGINE AND METHOD OF OPERATION THEREOF

PRIORITY INFORMATION

This application claims priority to and the benefit of U.S. Provisional Application Ser. No. 60/930,821 entitled "ZERO FLOAT VALVE" filed on May 18, 2007, the contents of which are incorporated herein by reference.

FIELD OF THE INVENTION

The present invention relates generally to valve mechanisms for controlling gas flow in an internal combustion engine and, more particularly, to an intake and exhaust valve mechanism for controlling gas flow into and/or out of a combustion chamber of an internal combustion engine.

BACKGROUND OF THE INVENTION

Internal combustion engines (e.g., 4-stroke engines) use valves to control the flow of combustion gases into and out of a combustion chamber defined in part by a piston situated within a cylinder that is coupled and drives an engine's crankshaft. Several different types of valve mechanisms are commonly used and are conventionally known as poppet valves, rotary valves, slide (or sliding) valves, piston valves, and hinged valves.

Although poppet valves are the most common valve used to control the flow of gases into and out of the combustion chamber in internal combustion engines, they suffer from several shortcomings. For example, as conventional poppet (e.g., intake and exhaust) valves typically use spring for closing the valves, when operating engines at high revolutions-per-minute (RPM), poppet valves can float, which can result in damage to the engines, loss of efficiency, and an increase in exhaust emissions. Accordingly, to reduce the likelihood of valve float, a secondary valve spring is often used in combination with a primary valve spring. However, using two springs increases forces on the valve train, which would require a more robust valve train, which can increase cost and add complexity. Further, during operation, a valve spring converts kinetic energy to friction energy, which reduces efficiency of an engine.

Further, conventional poppet valves can be operated using solid or hydraulic lifters. Solid lifters must be adjusted periodically during an engine's lifespan so that proper lash is maintained. Further, if proper valve lash is not maintained, the valves may be damaged (e.g., due to overheating, in the case of too little lash, or mushrooming, in the case of too much lash), and the engine may lose efficiency. Accordingly, many engines use hydraulic lash adjusters, which increases costs and pumping losses, as well as complexity.

Further, as an overhead-type poppet valve protrudes into at least part of the combustion chamber when opened, the location of a poppet valve and/or a corresponding piston must be controlled so that the valve does not contact the piston during operation. Accordingly, either or both the piston and the valve must be shaped, sized, and/or located, so as to insure that proper distance is maintained between the valve and piston at all times. This can increase design costs and result in a less than optimum valve train design and/or construction. For example, the size and the travel of the valve is often limited so as to prevent the valve from striking the piston during operation, which can adversely affect the flow through the valve and reduce the efficiency of the engine.

Accordingly, may attempts have been made to design other types of intake and/or exhaust valves for internal combustion engines. For example, rotary valve engines such as those which are described in, for example, U.S. Pat. No. 5,878,707 entitled ROTARY VALVE INTERNAL COMBUSTION ENGINE, to Ballard, etc., has been disclosed. However, rotary valves typically suffer from poor sealing and lubrication. Accordingly, many attempts have been made to provide better sealing and/or lubrication of the valves in engines of this type (e.g., see, U.S. Pat. No. 2,296,081, entitled "LUBRICATION OF ROTARY VALVES," to Metcalf, and U.S. Pat. No. 5,967,108 entitled "ROTARY VALVE SYSTEM," to Kutlucinar). However, to date rotary valves have still not become a commercial success.

With regard to the slide valve engines, these valves are also well known in the art and are described in, for example, U.S. Pat. No. 1,273,002, entitled "SLIDE VALVE MECHANISM," to Samuels; U.S. Pat. No. 1,537,248 entitled "INTERNAL COMBUSTION ENGINE," to Maloney; and U.S. Pat. No. 2,409,350 entitled "INTERNAL-COMBUSTION ENGINE," to Forrest. Typically, these engines uses a plate having an aperture which is aligned with a manifold to flow connect the combustion chamber to the manifold. Similarly to the rotary valve engines, these valves also suffer from lubrication and sealing problems.

With regard to piston-type valves, such as, those which are disclosed in U.S. Pat. No. 1,303,748 entitled "VALVE GEAR FOR INTERNAL COMBUSTION ENGINES," to Wattel; U.S. Pat. No. 1,332,265, entitled "GASOLINE-MOTOR," to Lehman, and U.S. Pat. No. 2,202,292 entitled "INTERNAL COMBUSTION ENINGE," to Hickey, among other deficiencies, these piston-type valves suffer from sealing problems.

Accordingly, there is a need for an internal combustion engine valve apparatus which can reduce or eliminate the problems and disadvantages of the prior art.

SUMMARY OF THE INVENTION

Therefore, it is an object of the present invention to solve the above-noted and other problems of conventional internal combustion engine valve trains and to provide an apparatus and a method for controlling the flow of gases such as intake and/or exhaust gases (hereinafter collectively referred to as combustion gases) into and out of a combustion chamber of an internal combustion engine. It is another aspect of the present invention to provide a valve apparatus for an internal combustion engine which can be operated so as to selectively control the flow of intake and/or exhaust gases into and/or out of a combustion chamber of an internal combustion engine via mechanical and/or electrical means (e.g., camshafts, valve crankshafts, solenoids, etc.). It is yet another object of the present invention to provide a valve apparatus for an engine improves volumetric efficiency maintain proper compression within the combustion chamber. It is a further object of the present invention to provide a valve apparatus and system that can compensate for wear of moving parts so as to remain in adjustment. It is another object of the present invention to provide a valve apparatus is quiet and easily replaceable.

It is another object of the present invention to provide a system and a method for controlling the operation of the intake and/or exhaust valves of an internal combustion engine based upon rotational position of a main crankshaft of an engine (e.g. a power output shaft of the engine), speed (e.g., angular velocity of the crankshaft or RPM), power levels, temperature, etc.

The present invention provides a system and a method that can (gas) flow couple an intake manifold to a combustion chamber of an internal combustion engine via an intake port; and flow couple the combustion chamber to an exhaust manifold via an exhaust port. An intake or exhaust valve apparatus according to the present invention controls the flow coupling between a corresponding port and the combustion chamber. Thus, for example, the intake valve apparatus controls the gas (e.g., air, fuel, etc.) flow between the intake port and combustion chamber, and the exhaust valve apparatus controls the flow between the combustion chamber and the exhaust port.

According to an aspect of the present invention there is provided a valve apparatus for an internal combustion engine having a combustion chamber in which a fuel mixture is combusted as well as one or more of an intake port coupled to an intake manifold and an exhaust port coupled to an exhaust manifold, the valve apparatus including: a main part having a wall section defining at least part of a valve cavity that extends along a longitudinal length of the main part, and an opening located in the wall (walled) section of the main part and which is flow connected to the combustion chamber; an outer part configured and arranged so as to be reciprocally located within at least part of the valve cavity, the outer part having a wall section defining an inner passage which extends along a longitudinal axis of the outer part; an inner part coupled to the main part and having a first end situated outside of the valve cavity, and a second end situated within the inner passage of the outer part, the inner part having a wall section situated at least in part within the cavity and defining an inner passage located between the first and second ends, a first opening located at the first end and in flow communication with the manifold, and one or more openings in that part of the wall section which is situated within the cavity; and a driving part for reciprocally locating the outer part relative to both the main part and the outer part so as to alternate between a flow communication and flow-communication blocked states.

According to a further aspect of the present invention, in the flow communication state, the outer part is reciprocally located such that the one or more openings of the inner part are flow connected to the opening of the main part, thus enabling flow communication between the combustion chamber and the first opening of the inner part; and in the flow-communication blocked state, the outer part is located such that the wall section of the outer part fully covers the one or more openings of the inner part, and flow communication between the combustion chamber and the first opening of the inner part is blocked.

Moreover, the driving part can include a shaft coupled to a crankshaft of the engine; and a connecting part having first and second ends, the first end coupled to the shaft and the second end coupled to the outer part such that displacement of the connecting part causes the outer part to reciprocate relative to both the main part and the inner part. Moreover, the shaft can include a camshaft or a valve crankshaft.

Further, the valve apparatus can further include a first sealing part coupled to the outer part and located between an outer wall of the outer part and the wall section of the main part so as to restrict flow communication between an outer wall of the outer part and the wall section of the main part; and a second sealing part coupled to the outer part and situated within the inner passage of the outer part and located so as to slidably engage the wall section of the inner part so as to restrict flow communication between inner passage and the wall section of the inner part, when the valve is in a communication blocked state. The first or second sealing parts can include a plurality of sealing rings which are coupled to the outer part so as to reciprocate with the outer part. The valve apparatus can further include a passage located in the outer part which can pass a lubricating fluid to, or from, the wall section of the main part so as to lubricate parts of the areas that lie between the outer part and the main part.

According to the present invention, the valve apparatus can include an intake valve that, for example, is situated between the intake port and the combustion chamber so as selectively flow connect the intake manifold to the combustion chamber. Moreover, at least part of the main part may be formed integrally with a cylinder head, such that the opening of the main part is situated in the cylinder head, if desired.

According to yet another aspect of the present invention, there is provided a valve apparatus for an internal combustion engine having a combustion chamber in which a fuel mixture is combusted as well as an intake port coupled to an intake manifold and/or an exhaust port coupled to an exhaust manifold, the valve apparatus including: a main part having a wall section defining at least part of a valve cavity which extends along a longitudinal length of the main part, and an opening located in the wall section of the main part and which is flow connected to the combustion chamber; an outer part configured and arranged so as to be reciprocally located within at least part of the valve cavity, the outer part having a cylindrical wall section which extends along a longitudinal axis of the outer part; an inner part coupled to the outer part and having a first end situated outside of the cavity and a second end situated within the cavity and adjacent to the outer part, the inner part having a wall section defining an inner passage situated between the first and second ends, a first opening situated at the first end which is in flow communication with one of the intake or exhaust ports, and one or more openings in the wall section proximate to the second end; and a driving part for reciprocally locating the outer part and the inner part relative to the main part so as to alternate between a flow communication and flow communication blocked states. At least part of the main part may be formed integrally with a cylinder head, such that the opening of the main part is situated in the cylinder head.

According to yet another aspect of the present invention, in the flow communication state, the outer part is reciprocally located such that the one or more openings of the inner part are located within the valve cavity so as to be flow connected to the opening of the main part, thus enabling flow communication between the combustion chamber and the first opening of the inner part; and in the flow-communication blocked state the outer part is located such that the one or more openings of the inner part are located outside of the valve cavity so that flow communication between the combustion chamber and the first opening of the inner part is blocked.

Moreover, the driving part comprises can include a shaft coupled to a crankshaft of the engine; and a connecting part having first and second ends, the first end coupled to the shaft and the second end coupled to the outer part such that displacement of the connecting part causes the outer part and the inner part to reciprocate relative to the main part. The shaft can include a camshaft or a valve crankshaft.

According to the present invention, the first sealing part can be coupled to the outer part and located between the outer part and the wall section of the main part so as to restrict flow communication between the outer part the wall section of the main part; and a second sealing part can be coupled to the main part and situated outside of the main part such that the inner part can pass therethrough, so as to restrict flow communication between the second sealing part and the inner part, when the valve is in a communication blocked state. Further, the first sealing part can include a plurality of sealing rings which are attached to the outer part so as to reciprocate with the outer part. The valve apparatus may also include a passage located in the outer part which can pass a lubricating fluid to or from the wall section of the main part. The valve apparatus may be used as an exhaust valve and is situated between the combustion chamber and the exhaust port so as to selectively flow connect the combustion chamber to the exhaust manifold or as an intake valve.

Further, at least part of the main part is formed integrally with a cylinder head, such that the opening of the main part is situated in the cylinder head.

According to yet another aspect of the present invention, there is provided an internal combustion engine having a cylinder defining at least part of a combustion chamber in which a fuel mixture is combusted, an intake port coupled to an intake manifold, and an exhaust port coupled to an exhaust manifold, the internal combustion engine can include a valve for controlling flow to or from the combustion chamber, the valve can include: a main part having a wall section defining a valve cavity extending along a longitudinal length of the main part and an opening located in the wall section of the main part, the opening flow connected to the combustion chamber; an outer part configured and arranged so as to be reciprocally located in the valve cavity, the outer part having a wall section defining an inner passage extending along a longitudinal axis thereof; an inner part connected to the main part and having a first end situated outside of the cavity and a second end situated within the cavity and the inner passage of the outer part, the inner part having a wall section defining an inner passage extending between the first and second ends, a first opening at the first end in flow communication with the manifold, and one or more openings in that part of the wall section which is situated within the cavity; and a driving part for reciprocally locating the outer part relative to both the main part and the outer part so as to alternate between a flow-communication and a flow communication blocked states.

According to another aspect of the present invention, there is provided a method for controlling (gas) flow into or out of a combustion chamber of a cylinder of an internal combustion engine using a valve apparatus including: a main part having a wall section defining at least part of a valve cavity extends along a longitudinal length of the main part, and an opening located in the wall section of the main part and which is flow connected to the combustion chamber; an outer part configured and arranged so as to be reciprocally located within at least part of the valve cavity, the outer part having a wall section defining an inner passage which extends along a longitudinal axis of the outer part; an inner part coupled to the main part and having a first end situated outside of the valve cavity, and a second end situated within the inner passage of the outer part, the inner part having a walled section situated at least in part within the cavity and defining an inner passage located between the first and second ends, a first opening located at the first end and in flow communication with the manifold, and one or more openings in that part of the walled section which is situated within the cavity; and a driving part for reciprocally locating the outer part relative to both the main part and the outer part so as to alternate between a flow communication and flow communication blocked states, the method including positioning, using a valve actuation mechanism, the outer part relative to the main part so as to place the valve in a flow communication state or a flow-communication blocked states.

Thus, in the flow communication state, the outer part is reciprocally located such that the one or more openings of the inner part are flow connected to the opening of the main part, thus enabling flow communication between the combustion chamber and the first opening of the inner part; and in the flow communication blocked state the outer part is located such that the wall section of the outer part fully covers the one or more openings of the inner part, and flow communication between the combustion chamber and the first opening of the inner part is blocked. The method may further include controlling, by a controller (e.g., a microprocessor based controller—not shown) a solenoid (e.g., an electrical, mechanical, and/or an electromechanical solenoid) coupled to the outer part to position the outer part in a flow communication or flow communication blocked states.

BRIEF DESCRIPTION OF THE DRAWINGS

The invention is herein described, by way of example only, with reference to the accompanying drawings, wherein.

DETAILED DESCRIPTION OF THE INVENTION

Preferred embodiments of the present invention will now be described in detail with reference to the drawings. For the sake of clarity, certain features of the invention will not be discussed when they would be apparent to those with skill in the art.

Figures 1A, 1B:
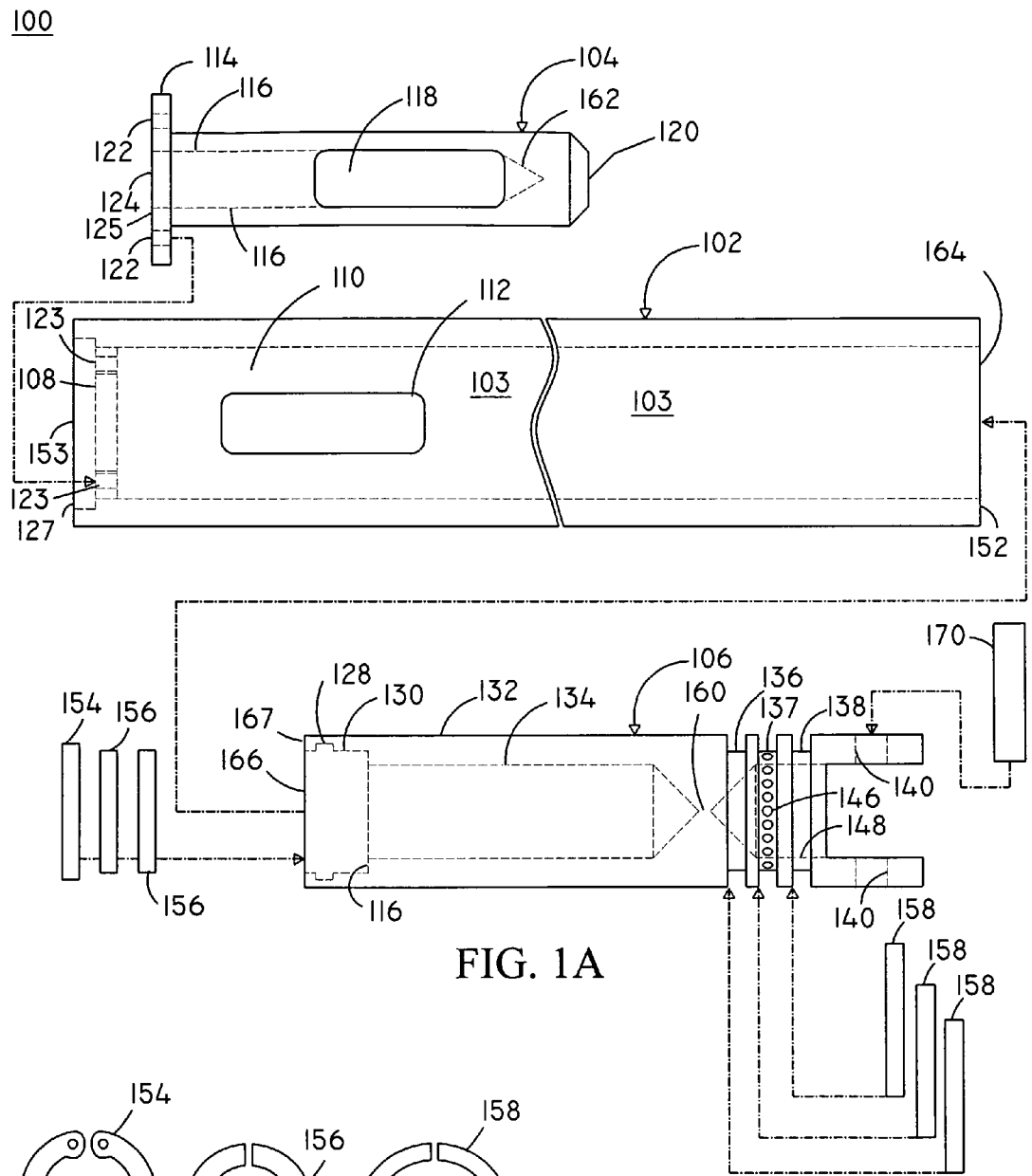
FIG. 1A is an exploded partial cross-sectional side view illustration of an intake valve apparatus according to the present invention.
FIG. 1B is a side view illustration showing front views of the seals of the valve apparatus shown in FIG. 1.

An exploded partial cross-sectional side view illustration of an intake valve apparatus according to the present invention is shown in FIG. 1A. The intake valve apparatus includes one or more of an external valve guide sleeve 102 (hereinafter guide sleeve), an internal open port valve guide 104 (hereinafter valve guide) which is attached to the guide sleeve 102, and a valve body 106 which slidably communicates with the guide sleeve 102 and the valve guide 104.

The guide sleeve 102 includes one or more of first and second ends 153 and 152, respectively, an internal passage 110 located between the first and second ends, an open port hole 112, a first opening 108 and a second opening 164 and a recessed area 127. The internal passage 110 is circular in cross section and is shaped and sized such that the valve body 106 can be slidably located within the guide sleeve 102. The open port hole 112 extends radially along the longitudinal axis of the guide sleeve 102 such that it extends between the internal passage 110 and an exterior 103 of the guide sleeve 102 so as to provide gas flow communication (hereinafter flow communication) to/from the internal passage 110 to/from the exterior portions. The open port hole 112 is shaped and sized such that it can provide necessary flow communication to/from the internal passage 110, as desired. The first end opening 108 and the second end opening 164, are respectively located proximate to, or at, the first end 153 and the second end 152 of the valve guide 102. The first end opening 108 can be circular in shape and sized so that the valve guide 104 can be slidably inserted therein. If using the optional recessed area 127, the first end opening 108 may extend between the recessed area 127 and the internal passage 110, as shown. The second end opening 164 can also be circular in shape and sized such that the valve body 106 can be slidably inserted thereto. Optional holes 123 can be used to secure the valve guide 104 to the guide sleeve 102.

The valve guide 104 includes one or more of first and second ends 125 and 120, respectively, one or more open port holes 118, an internal passage 116, a mounting part such as a flange 114, mounting holes 122, an internal end wall 162, and an opening 124. The valve guide 104 is inserted at least partially within the internal passage 110 of the guide sleeve 102 and can be attached to the guide sleeve 102 using any suitable method. For example, bolts (not shown) can pass though the mount holes 122 of the mounting part 114 into the holes 123 of the guide sleeve 102 such that the valve guide 104 can be attached to the guide sleeve 102. The flange 114 may be shaped and sized such that it can at least in part fit within the optional recessed area 127 of the guide sleeve 102. The internal passage 116 extends along the longitudinal axis of the valve guide 104 and is located between the internal end wall 162 and the opening 124. The one or more open port holes 118 are located in an area between the internal end wall 162 and the opening 124 and are in flow communication with the internal passage 116. The second end 120 may include a bevel, a round, etc. so as to aid in assembly of the valve apparatus according to the present invention. Although not shown, the valve guide 104 may be optionally formed integrally with the guide sleeve 102. Further, the valve guide 104 can be optionally attached to the guide sleeve 102 (or otherwise held in place by) using, for example, a weld, a press fit, a friction fit, a screw fit, etc. as desired. Accordingly, the flange 114 is optional.

The valve body 106 includes an internal valve guide passage hole 134 which is preferably circular in cross section and is shaped and sized such that the valve guide 104 can be slidaby inserted (at least in part) therein. A passage end opening 166 is located at a first end 167 of the valve body 106 opposite a passage end 160. An optional compression ring groove 130 locates one or more compression rings 156. The compression rings 156 are optionally located between a ring landing 116 and a snap ring seal 154 which is inserted within a retaining ring grove 154 such that the one or more compression rings 156 are held in a desired position. However, it is also envisioned that the one or more compression rings 156 can be held in position using a flange, a threaded ring, etc., as desired. Further, spacers, such as for example, washers, rings, etc., (not shown) may be located on one or more sides of the compression rings 156 so as to separate them, as desired. One or more optional ring groves 136, 137, and 138 can be used to position external clamp ring seals 158, as shown. One or more optional oil holes 146 can be located in any of the ring groves 136-138 and provide lubrication fluid from an oil passage 148 to one or more of the external clamp ring seals 158, as desired, so as to provide a lubrication fluid such as, for example, engine oil, between the guide sleeve 102 and the valve body 106. The clamp ring seals 158 are similar to rings used in automotive applications, e.g., piston rings, and may include compression and/or oil control rings and/or a combination thereof. As sealing rings are well known in the art, a further description thereof will be omitted for the sake of clarity.

The valve body 106 can be reciprocated within the guide sleeve 102 using any suitable force-transmitting member. For example, a connecting rod (not shown) may couple a force to or from, for example, a solenoid, a camshaft, and/or a crankshaft-type valve operating mechanism (not shown). In the present example, a connecting rod (or other force-transmitting member—not shown) is coupled to the valve body 106 via a valve body pin 170 (which can be, for example, similar to a conventional reciprocating internal combustion engine piston pin) which can be inserted into holes 140 and can held in place by, for example, one or more snap rings, etc. (not shown). As connecting rods and/or piston pins are well known in the art, for the sake of clarity, a further description thereof will not be given. In operation, the force-transmitting member (e.g., the connecting rod) reciprocally locates the valve body 106 relative to the guide sleeve 102 and the valve guide 104 so as to control flow communication through the valve and thus open or close a gas-flow path into and/or out of the combustion chamber.

Although not shown, the guide sleeve 102 can be formed integrally with a cylinder head, an engine block (both of which are not shown), or other parts of an engine, or may be attached to these components, as desired.

Although not shown, certain parts of the valve body 106, valve guide 104 and/or guide sleeve 102 may be coated with an anti-friction coating so as to reduce friction between the valve body 106, valve guide 104 and/or guide sleeve 102 during operation.

A side view illustration showing front views of the seals of the valve apparatus shown in FIG. 1A is shown in FIG. 1B. The snap ring 154 can include any suitable snap ring. Likewise, the internal and external compression ring seals 156 and 158, respectively can include a groove as shown such that they can easily installed.

Although the valve apparatus of FIG. 1A has been described with reference to an intake valve apparatus, it may also be used to provide for an exhaust valve apparatus, as desired.

Figure 2:
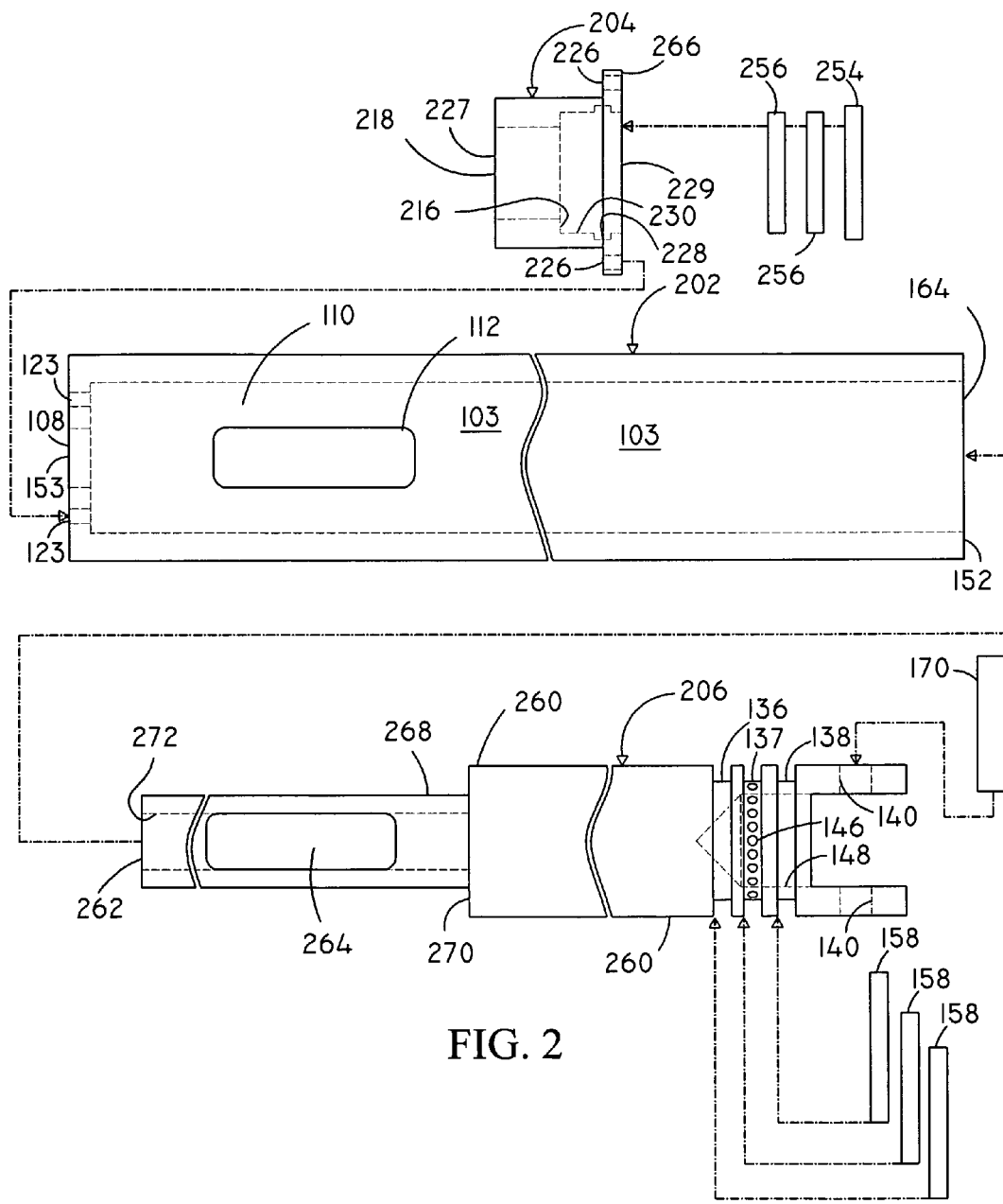
FIG. 2 is an exploded side view illustration of an exhaust valve apparatus according to the present invention.

An exploded side view illustration of an exhaust valve apparatus according to the present invention is shown in FIG. 2. The exhaust valve apparatus includes one or more of a valve guide 202, a valve body 206, and an internal compression seal housing 204 (seal housing). The valve guide 202 is similar to the valve guide 102 as shown in FIG. 1. However, the recessed area 127 is not shown but may be used if desired (e.g., to hold a flange 266 of a seal housing 204) Accordingly, for the sake of simplicity the valve guide 202 may be referred to as the valve guide 102 and a detailed description of the valve guide 202 will not be given.

The seal housing 204 can be attached to or formed integrally with the valve guide 202. For example, a flange 266 can include one or more holes 226 which align with similar holes 123 on the valve guide 202. Accordingly, threaded members such as, for example, bolts and/or studs (both of which are not shown) may be inserted within the bolt holes (226, 123) and may be used to attach the seal housing 204 to the valve guide 202. However, it is also envisioned that other suitable methods (e.g., welding, friction fits, compression fits, etc.) may also be used, to attach the seal hosing 204 to the valve guide 202. The seal housing 204 includes one or more seals (e.g., to prevent gas and or liquid flow) such as, for example, internal compression seals 256 which fit within an internal compression ring seal groove 230. The internal compression seals 256 are similar to the internal compression seals 156 of FIG. 1, and accordingly, a further description thereof will not be given. The compression ring seal groove 230 is shaped and sized to hold the internal compression ring seals 256 in a desired position such that they are located between a ring landing 216 and a retaining member. A suitable retaining member can include a snap ring seal 254, which is similar to the snap ring seal 154, which is placed within a retaining ring groove 228, which is similar to the retaining ring grove 128 of FIG. 1. However, it is also envisioned that the retaining member may include a threaded ring, a flange that is attached to the seal housing 204 and/or is part of the valve guide 202, etc. The seal housing 204 includes a passage 218 which extends along the longitudinal length of the valve seal 204. An open port valve hole 227 is located at one end of the passage 218, and a passage opening 229 is located at another end of the passage 218.

The valve body 206 includes a valve guide 268, connected to a base part 260. The base part 260 and the valve guide 268 each have a cylindrical cross-section. The valve body 206 includes similar features to those of the valve body 106 that are shown in FIG. 1 (e.g., features denoted by numerals 136-138, 140, 146, 148, 158, and 170). Accordingly, for the sake of clarity, a further description of these features will not be given. The valve guide 268 is connected to a distal end 270 of the base part 260. The valve guide 268 includes an internal passage 272 which extends along the longitudinal axis of the valve guide 268. An opening 262 is located at an end of the internal passage 270, and a port hole 264 is flow connected to the internal passage 272. The valve guide 268 has a length which is sufficiently great such that at least a part of it remains in the seal housing 204 and/or the first opening 108 when the port hole 264 is in gas-flow communication with the open port hole 112 of the guide sleeve 202 (e.g., the valve is in an open position). This will ensure proper alignment of the valve guide 268 during operation. When in the closed position, the seals (e.g., 158 and 256) ensure that the gas-flow communication between the open port hole 112 and the opening 264 is prevented or entirely stopped.

Figure 3A:
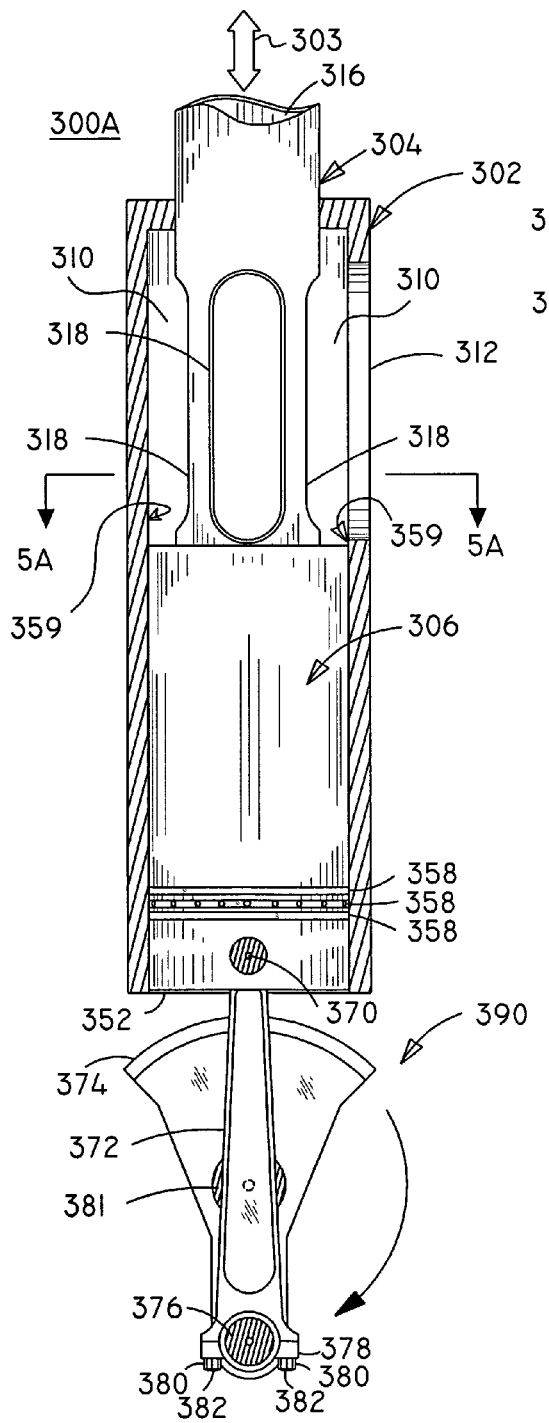
FIG. 3A is a partial cross-sectional view illustration of the exhaust valve apparatus according to the present invention.

A partial cross-sectional view illustration of the valve apparatus according to the present invention is shown in FIG. 3A. Valve apparatus 300A substantially corresponds with the valve apparatus shown in FIG. 1A with minor differences (e.g., see, the piston skirt which is not bifurcated at an end as shown in FIG. 1). As shown in FIG. 3A, the valve apparatus 300A in a fully open (gas) flow position. The valve apparatus 300A includes an external valve guide sleeve (hereinafter guide sleeve) 302, an internal open port valve guide (hereinafter valve guide) 304, a valve body 306, and a valve operating mechanism 390 which reciprocally locates the valve body 306 relative to the guide sleeve 302 and the valve guide 304. The valve operating mechanism 390 can include one or more of a balance weight 374, a connecting rod 372, a valve crankshaft 381, a crankpin 376, an end cap 378, studs 382, nuts 380, a valve body pin 370, and a valve body pin retaining member such as, for example, a snap-ring retaining pin (not shown). The balance weight 374 is optional and may be used to balance the valve operating mechanism 390 to reduce and/or prevent vibration. As balance weights are known in the art, for the sake of clarity, a further description thereof will be omitted. A proximal end of the crank pin 376 is connected to the valve crankshaft 381 and to the connecting rod 372. The connecting rod 372 is attached to the crank pin 376 using any suitable method, such as, for example, the end cap 378. The end cap 378 can be attached to the connecting rod 372 using any suitable method, such as, for example, studs 382 and nuts 380. The connecting rod 372 is attached to the valve body pin 370 at its distal end. The valve body pin 370 is held in position by any suitable method such as, for example, one or more retaining rings which fit into a corresponding groove (not shown) in a hole 340 of the valve body 306. The valve body pin 370 may also be held in position using a threaded connector, compression fit, etc., as desired.

The guide sleeve 302 has an internal passage 310 that has a cylindrical cross section and is at least partially defined by an inner wall 359. The internal passage 310 is shaped and sized so as to receive the valve body 306. An open port hole 312 is situated in a wall of the guide sleeve 302 such that it is in flow communication with the internal passage 310 and an adjacent combustion chamber (not shown) of a corresponding cylinder of an internal combustion engine.

The valve guide 304 is attached to the guide sleeve 302 such that the valve guide 304 is situated at least in part within the internal passage 310 of the guide sleeve 302 and can be reciprocated therein. The valve guide 304 includes an internal passage 316 that extends (at least in part) along a longitudinal length thereof, and one or more open port holes 318 (four shown in the present example) which are in flow communication with the internal passage 316.

Figure 3B:
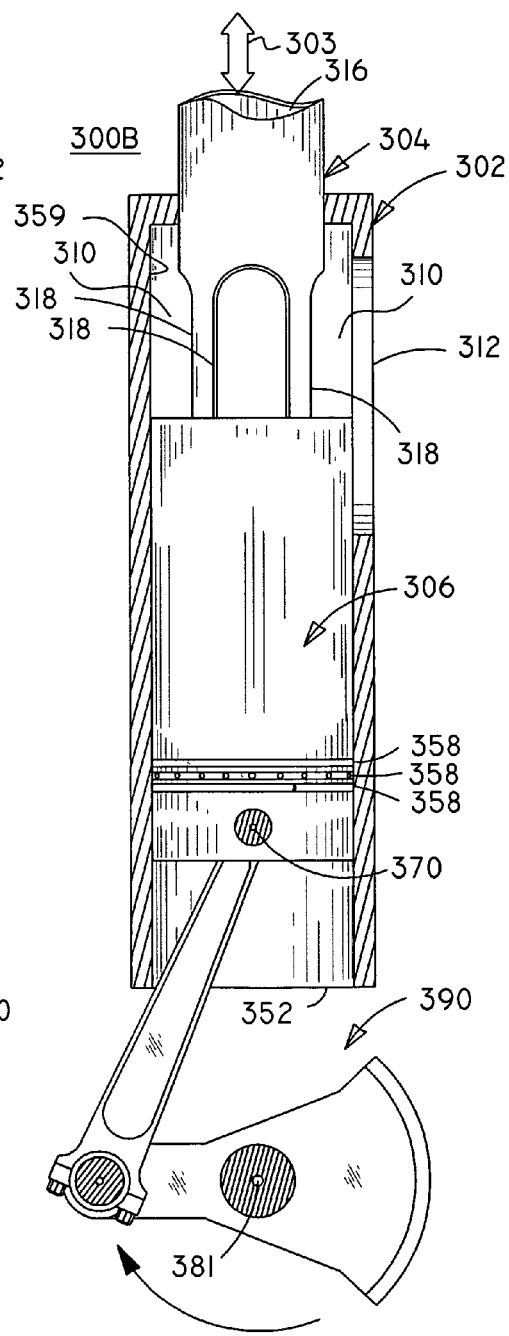
FIG. 3B is a partial cross-sectional view illustration of the valve apparatus shown in FIG. 3A in a partially open position.
Figure 3C:
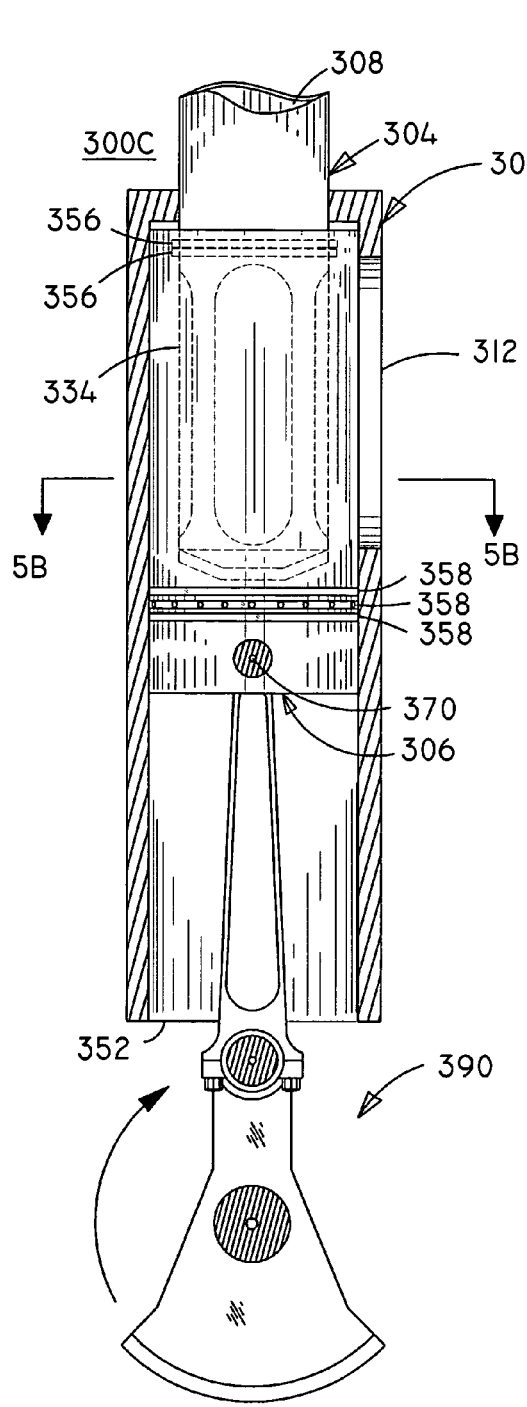
FIG. 3C is a partial cross-sectional view illustration of the valve apparatus of FIG. 3A in a closed position.

The valve body 306 includes one or more internal valve guide passage holes 334 (e.g., see, internal valve guide passage hole 134 FIG. 1A), one or more internal compression rings 356, and external compression ring seals 358 (e.g., see, FIG. 3C). The valve body 306 is located within the internal passage 310 of the guide sleeve 302 such that at least part of the guide sleeve 304 is situated within the internal valve guide passage hole 334 during operation. The external compression ring seals 358 maintain a seal between the valve body 306 and the wall 359 of the internal passage 310 of the guide sleeve 302. Likewise, the internal compression rings 356 maintain a seal between the valve body 306 and the internal open port valve guide 304.

As the valve apparatus 300A is in an open full-flow position, the open port hole 312 is (fully) flow connected to the internal passage 316 of the internal open port valve guide 312 via the internal passage 310 and open port holes 318. Thus, when used as an intake valve, an intake gas flow (e.g., air, exhaust gas recirculation (EGR) gases, and/or a fuel mixture) can enter the internal passage 316, flow through the one or more open port holes 318 into the internal passage 310, and then flow into the combustion chamber via the open port hole 312.

Figure 3D:
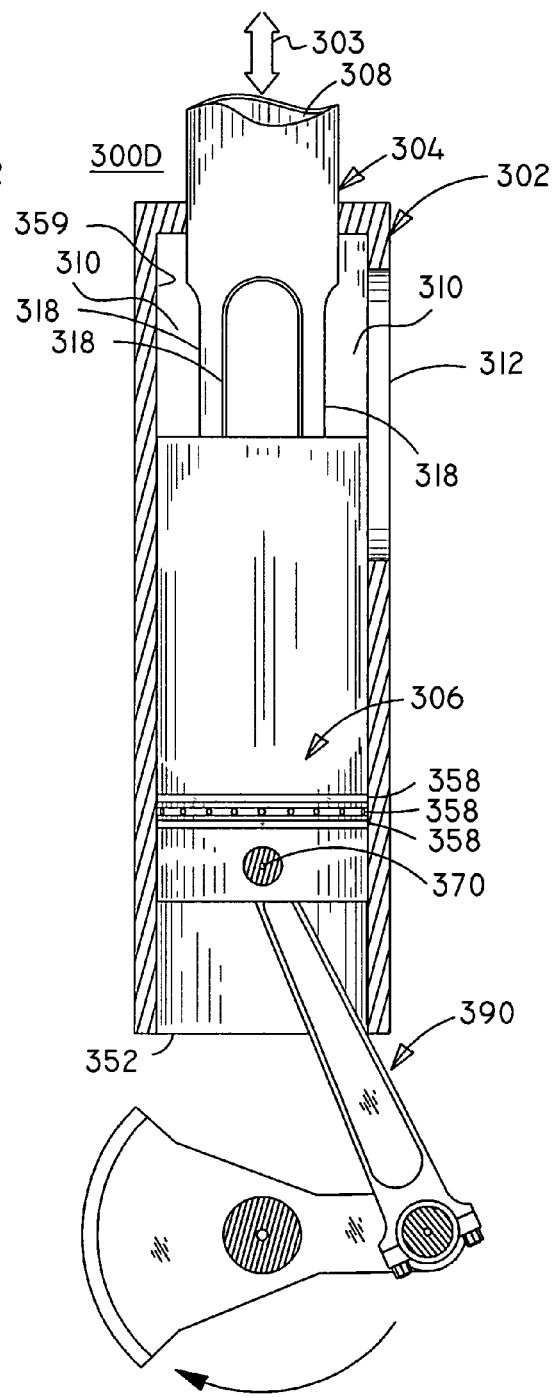
FIG. 3D is a partial cross-sectional view illustration of the valve apparatus shown in FIG. 3A in a partially open position.

A partial cross-sectional view illustration of the valve apparatus shown in FIG. 3A in a partially open position is shown in FIGS. 3B and 3D. The valve apparatus 300B and 300D are shown in a partially open position. In FIGS. 3B and 3C, the valve crankshaft 381 has been rotated so as to locate the valve body 306 in a partial (gas) flow position. Accordingly, valve body 306 partially blocks flow to and/or from the open port holes 318. Thus, a gas flow (e.g., an intake gas flow) to (in the case or an intake air charge) or from (in the case of an exhaust charge) the combustion chamber through the corresponding valve is partially restricted. It should be noted that combustion gases can also include gases which enter and/or exit a cylinder when a cylinder has been deactivated as in the case of an engine which has a cylinder deactivation system that is used, for example, to conserve fuel during light engine load conditions. Accordingly, the valve apparatus of the present invention may also be used with a cylinder deactivation system.

A partial cross-sectional view illustration of the valve apparatus of FIG. 3A in a closed position is shown in FIG. 3C. The valve apparatus 300C is in a fully closed position. As such, the valve body 306 fully covers the open port holes 318 of the valve guide 304. Accordingly, there is no (or negligible) (gas) flow communication between the open port hole 312 and the one or more open port holes 318. Further, a gas seal is maintained by the external compression ring seals 358 (which maintain a seal between the valve body 306 and wall 359 of the guide sleeve 302) and the internal compression rings 356 (which maintain a seal between an internal valve guide passage hole 334 and an exterior surface of the internal open port valve guide 304), as shown.

Thus, according to the present invention, an engine can have a cylinder including a combustion chamber that is coupled to for example, a valve such as is shown in FIG. 1A (e.g., for an intake valve) and/or another valve different from the first valve such as is shown in FIG. 2A (e.g., for an exhaust valve). Further, each cylinder in a multiple cylinder engine can have a valve arrangement that is similar to the arrangement that is described above.

Although the valve body is operated by (e.g., is coupled to and receives a reciprocating operating force from) a valve crankshaft in the present example, it is also envisioned that a conventional camshaft having lobes (of sufficient size) may also be used to operate the valve body. Accordingly, a force-transmitting member such as a rocker arm, a lifter etc., can be used to couple a corresponding lobe of the camshaft to the valve body 306 for providing a reciprocating motion thereto. Further, a desmodromic-type valve actuation system may be used to open and/or close the valve apparatus of the present invention. Thus, rather than transfer a reciprocating motion to a valve stem of a conventional poppet valve, the desmodromic valve actuation system would transfer the reciprocating motion to the valve body (e.g., see, 106, 206) via, for example, a force-transmitting member coupled to the valve body. Moreover, the force-transmitting member such as, for example, a connecting rod, may be coupled to the valve body using any suitable method. For example, a ball and socket coupling, a hook, a solid connection, etc. may be used. As desmodromic-type valve actuation systems are known in the art (e.g., see, U.S. Pat. No. 4,763,615, entitled "Desmodromic Valve System," to Frost (Frost) which is incorporated herein in the entirety) a further description thereof will not be given.

Figures 4A, 4B:
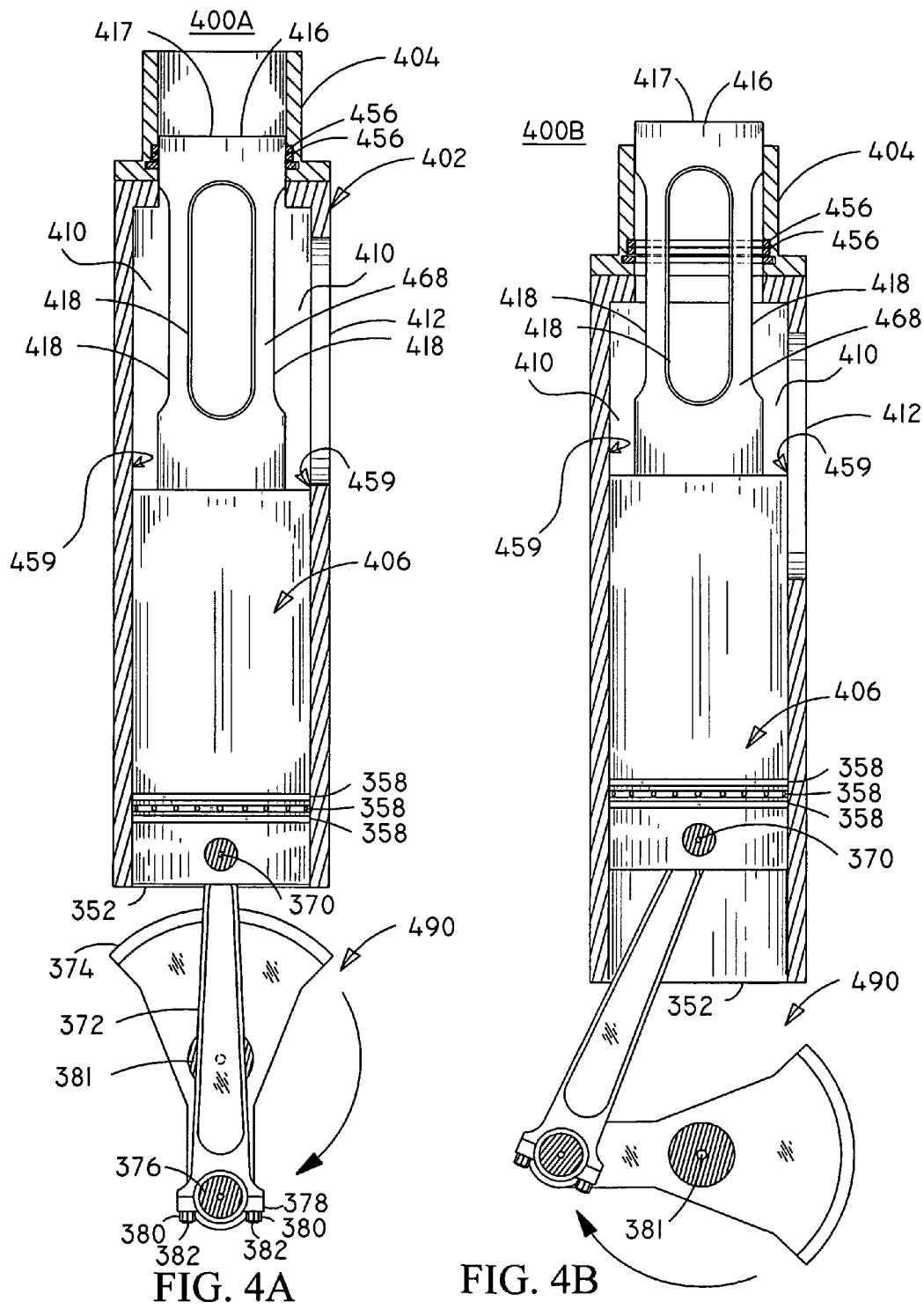
FIG. 4A is a partial cross-sectional view illustration of the exhaust valve apparatus according to the present invention.
FIG. 4B is a partial cross-sectional view illustration of the valve apparatus shown in FIG. 4A in a partially open position.

A partial cross-sectional view illustration of the exhaust valve apparatus according to the present invention is shown in FIG. 4A. Valve apparatus 400A substantially corresponds with the valve apparatus shown in FIG. 2A with minor differences (e.g., see, piston skirt of valve body 406). As shown in FIG. 4A, the valve apparatus in a fully open (gas) flow position. The valve apparatus 400A includes an external valve guide sleeve (hereinafter guide sleeve) 402 (which is similar to 302 in FIG. 3A), an internal open port valve guide 468, a valve body 406, an internal compression seal housing (hereinafter seal housing) 404, and a valve operating mechanism 490. As the valve operating mechanism 490 is similar to the valve operating mechanism 390 of FIG. 3A, for the sake of clarity, similar numerals will be used and a further description thereof will not be given.

The guide sleeve 402 has an internal passage 410, that has a cylindrical cross section, and is defined by an inner wall 459. The internal passage 410 is shaped and sized so as to receive reciprocally the valve body 406. An open port hole 412 is situated in the inner wall 459 of the guide sleeve 402 such that it (i.e., the open port hole 412) is in flow communication with the internal passage 410 and a combustion chamber (not shown) of a corresponding cylinder when the valve apparatus 400A is in an open position (as shown).

The valve guide 468 is attached to (or formed integrally with) the valve body 406 such that the valve guide 468 can be situated at least in part within the internal passage 410 so as to selectively place the valve apparatus 400A in an open (gas) flow configuration. The valve guide 468 includes an internal passage 416 extending along a longitudinal length thereof, an opening 417, and one or more open port holes 418 (four shown in the present example as compared to two in each of the valve apparatuses of FIGS. 1A and 2) which are in flow communication with each other.

The seal housing 404 includes one or more internal compression rings 456. The valve body 406 includes external compression ring seals 358 for reducing or entirely preventing (gas) flow (e.g., see, FIG. 3C). The valve body 406 is located within the internal passage 410 of the guide sleeve 402 such that at least part of the valve guide 468 is located within the valve guide passage hole 334 (show as dotted lines) during operation. The external compression ring seals 358 maintain a seal between the valve body 406 and the wall 459 of the internal passage 410 of the external valve guide sleeve 402. Likewise, the internal compression rings 456 maintain a seal between the valve guide 468 and the valve seal open port valve guide 404.

As the valve apparatus 400A is in an open full-flow position, the open port hole 412 is (gas) flow connected to the internal passage 416 of the valve guide 468 via cavity 410 and open port holes 418. Thus, when used as, for example, an intake valve, an intake gas flow (e.g., air, exhaust gas recirculation, and/or a fuel mixture) can enter the internal passage 416 and flow through the one or more open port holes 418 into the cavity 410 and then flow into the combustion chamber via the open port hole 412. Accordingly, when used as, for example, an exhaust valve, the flow is the reverse of that described above.

Figure 4C:
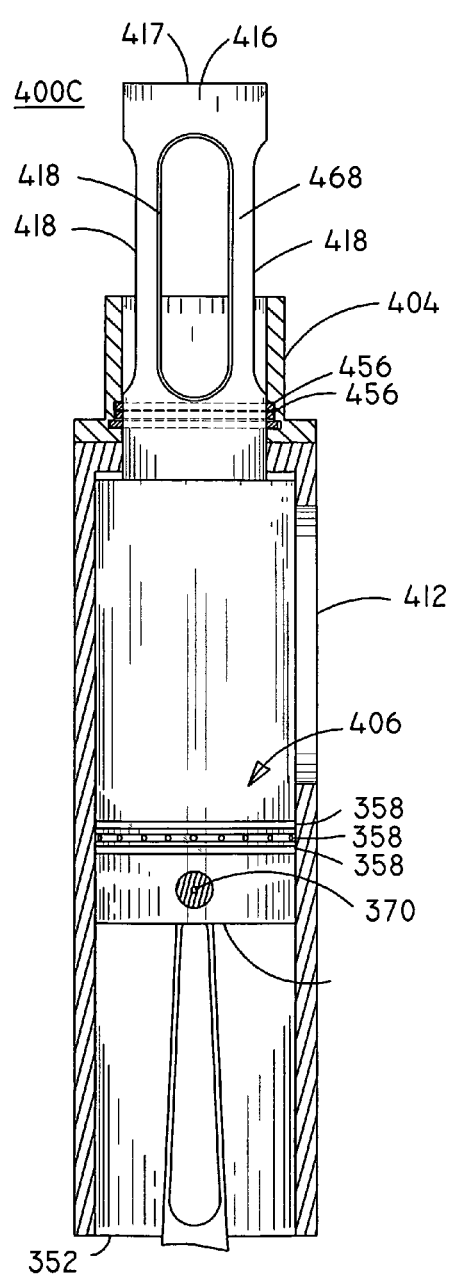
FIG. 4C is a partial cross-sectional view illustration of the valve apparatus shown in FIG. 4A in a partially open position.
Figure 4D:
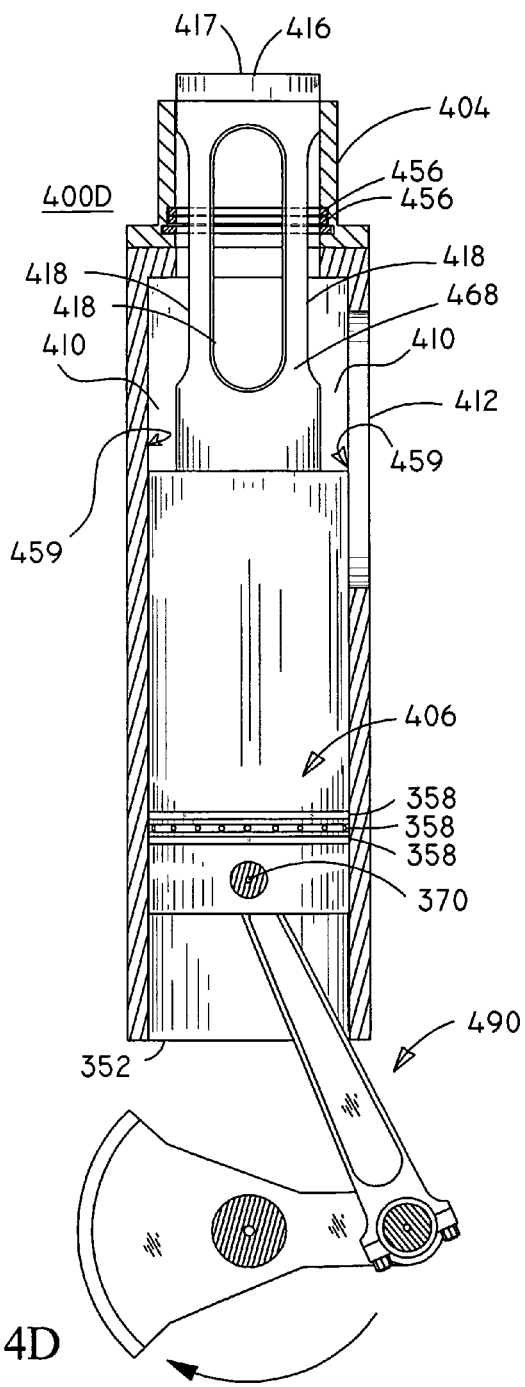
FIG. 4D is a partial cross-sectional view illustration of the valve apparatus of FIG. 4A in a closed position.

Partial cross-sectional view illustrations of the valve apparatus shown in FIG. 4A in a partially open position are shown in FIGS. 4B and 4D. The valve apparatus 400B and 400D are shown in a partially open position. In FIGS. 4B and 4C, the valve crankshaft 381 has been rotated so as to locate the valve body 406 in a partial (gas) flow position. Accordingly, the open port holes 418 of the internal open port valve guide 468 are partially situated outside of the cavity 410 so as to restrict the flow of gas between the opening 417 and the open port hole 412. Thus, gas flow (e.g., an intake or exhaust gas flow) between the open port hole 412 and the internal passage 416 is partially restricted.

A partial cross-sectional view illustration of the valve apparatus of FIG. 4A in a closed position is shown in FIG. 4C. The valve apparatus 400C is in a full closed position. As such, the valve body 406 is located such that the open port holes 418 of the valve guide 468 are situated outside of the internal passage 410 and sealed by the internal compression rings 456. Additionally, the valve body 406 may fully or partially cover the open port hole 412. Accordingly, there is no (or negligible) gas flow communication between the opening 417 of the valve guide 468 and the open port hole 412. Further, a proper seal is maintained by the external compression ring seals 358 (which maintain a seal between the valve body 406 and wall 459 of the guide sleeve 402), as shown.

Although the valve body (e.g., 306, 406) is operated by (e.g., is coupled to and receives an operating reciprocating force from) a valve crankshaft (e.g., via connecting rod 372), it is also envisioned that a conventional camshaft having lobes (of sufficient size and shape) may also be used to operate the valve body. Accordingly, a force-transmitting member such as a tappet, a rocker arm, a fulcrum, a lifter, etc., can be used to couple a corresponding lobe of the camshaft to the valve body. Further, a desmodromic-type valve operating system and/or an electronic or solenoid-type operating system may be incorporated to open and/or close the valve apparatus of the present invention.

Figure 5A:
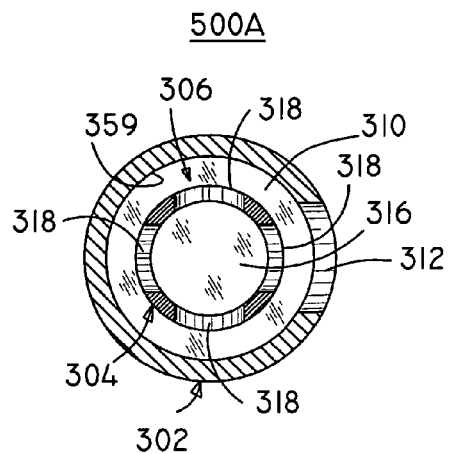
FIG. 5A is a cross-sectional view of the exhaust valve apparatus shown in FIG. 3A taken along lines 5A-5A.

A cross sectional view of the exhaust valve apparatus shown in FIG. 3A taken along lines 5A-5A is shown in FIG. 5A. As shown, valve apparatus 500A is in an open configuration. Accordingly, the internal passage 316 is in (gas) flow communication with the open port hole 312 of the guide sleeve 302 via the open port hole 318 (of the valve guide 304) and the internal passage 310. Although four open port holes 318 are illustrated, other numbers are also envisioned (e.g., 1, 2, 3, 5, 6 . . . etc.).

Figure 5B:
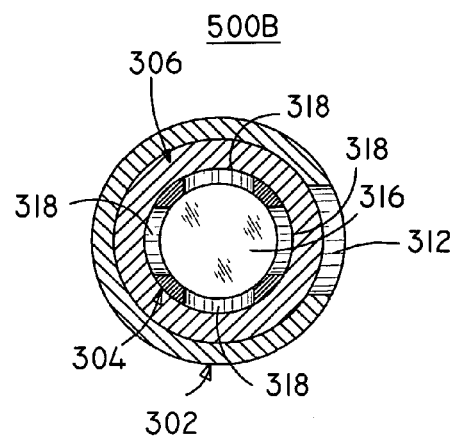
FIG. 5B is a cross-sectional view of the exhaust valve apparatus shown in FIG. 3C taken along lines 5B-5B.

A cross sectional view of the exhaust valve apparatus shown in FIG. 3A taken along lines 5B-5B is shown in FIG. 5B. As shown, the valve apparatus 500B is in a closed configuration. Accordingly, the internal passage 316 is not in (gas) flow communication with the open port hole 312 of the guide sleeve 302, as it is (at least in part) sealed by the valve body 306 as shown (and the seals 354, 358, not shown).

The valve apparatus of the present invention can be placed in various locations relative to a cylinder and combustion chamber of an internal-combustion engine. For example, the valve apparatus of the present invention may be placed in an L-, I—, F—, or T-head configurations or other arrangements if desired. Additionally, the valve apparatus can be placed in a valve-in-block and/or overhead valve configuration. For example, the valve apparatus can be used in a traditional overhead valve (OHV) hemispherical combustion chamber arrangement, a wedge arrangement, etc. Moreover, numerous intake and/or exhaust valve combinations are also possible. For example, one or more intake valves (e.g., as shown in FIG. 1A) may be used with one or more exhaust valves (e.g., as shown in FIG. 2). However, the valves of FIGS. 1A and 2 can be used in either an intake or an exhaust configuration, as desired.

Moreover, the valve apparatus of the present invention can be used in engines having any number of cylinders (e.g., 1, 2, 3, . . . ). Moreover, these engines can have configurations such as an inline, "V—," "X—," and/or "W"-type, radial, and horizontally-opposed-type engines.

Various valve configurations will now be shown for an internal combustion engine. However, it is also envisioned that other configurations are also possible.

Figure 6A:
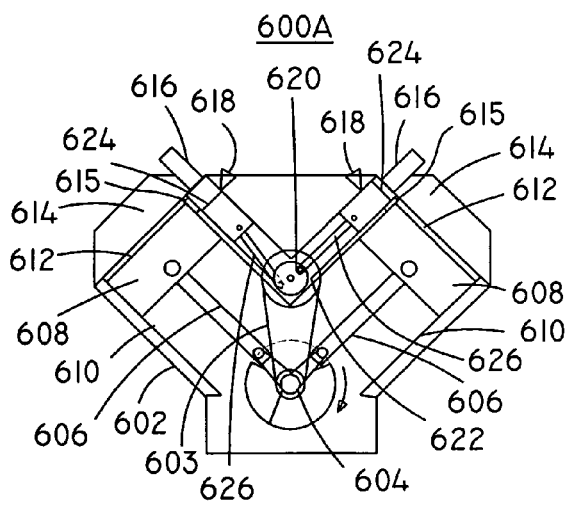
FIG. 6A is a block diagram illustrating a front view of the valve apparatus of the present invention installed in side-valve configuration in a v-type engine configuration.

A block diagram illustrating a front view of the valve apparatus of the present invention installed in side-valve configuration in a V-type engine configuration is shown in FIG. 6A. The engine 600A includes an engine block 602, a main crankshaft 604, connecting rods 606, pistons 608 mounted in cylinders 610, combustion chambers 612, cylinder heads 614, open port holes 712I and 712E (for intake (I) and exhaust (E) valves, respectively) intake and/or exhaust ports 616, and the valve apparatus of the present invention (e.g., the valve apparatus shown in FIG. 3A or 4A) 618. A force-transmitting member such as, for example, a timing belt or chain 603 transmits a force from a pulley coupled to the main crankshaft 604 to a valve operating member such as, for example, a camshaft (e.g., a desmodromic type), a valve crankshaft, etc.

The valve operating member 618 can include a common (i.e., single) valve crankshaft 620 which can transmit a force to a plurality of valve bodies 624 (e.g., see, 102, 202) for controlling (gas) flow communication into and/or out of the combustion chambers 612. Accordingly, the common valve crankshaft 620 can be placed in a suitable location (e.g., a valley 622 of the v-type engine) and can be coupled to the main crankshaft 604 using any suitable drive mechanism. Suitable drive mechanisms can include, for example, timing chains, belts, gears, shafts, and/or a combination thereof, as desired. For example, a suitable drive mechanism can include timing belts, gears, shafts, and/or chains (or combinations thereof) which can couple the valve crankshaft 620 to the main crankshaft 604 and maintain proper valve timing. The common valve crankshaft 620 is coupled to connecting rods 626, which in turn impart an operating force to the valve bodies 624. Although a single (common) valve crankshaft 620 is shown, two or more valve crankshafts may be used to operate the valves. For example, valves in each bank of the engine 600A can be operated using a valve crankshaft which activates only valves in the corresponding bank. Further, intake valves may be operated using one or intake first valve crankshafts and exhausts valves may be operated by one or more exhaust valve crankshafts. Further, a desmodromic-type actuation system may be used to impart a reciprocating motion to the valve guides during operation.

Figure 6B:
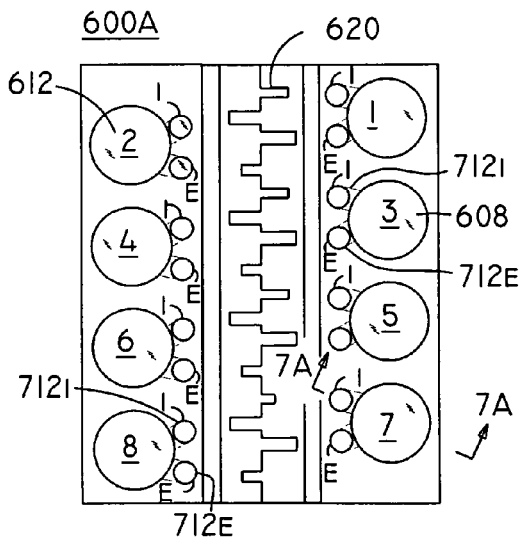
FIG. 6B is a block diagram illustrating a top view of the configuration of the valve apparatus of the present invention as shown in FIG. 6A.

A block diagram illustrating a top view of the configuration of the valve apparatus of the present invention as shown in FIG. 6A, is shown in FIG. 6B. The engine 620 is shown in an eight-cylinder v-type configuration; however, other numbers of cylinders are also possible. For example, four-, six-, eight-, ten-, twelve- . . . , etc. cylinder configurations are also possible. Each cylinder has a corresponding number and intake and exhaust valves denoted by "I" and "E," respectively. The cylinder heads have been removed for the sake of clarity. Moreover, the valve crankshaft is shown in general block form for illustration purposes.

Figure 7A:
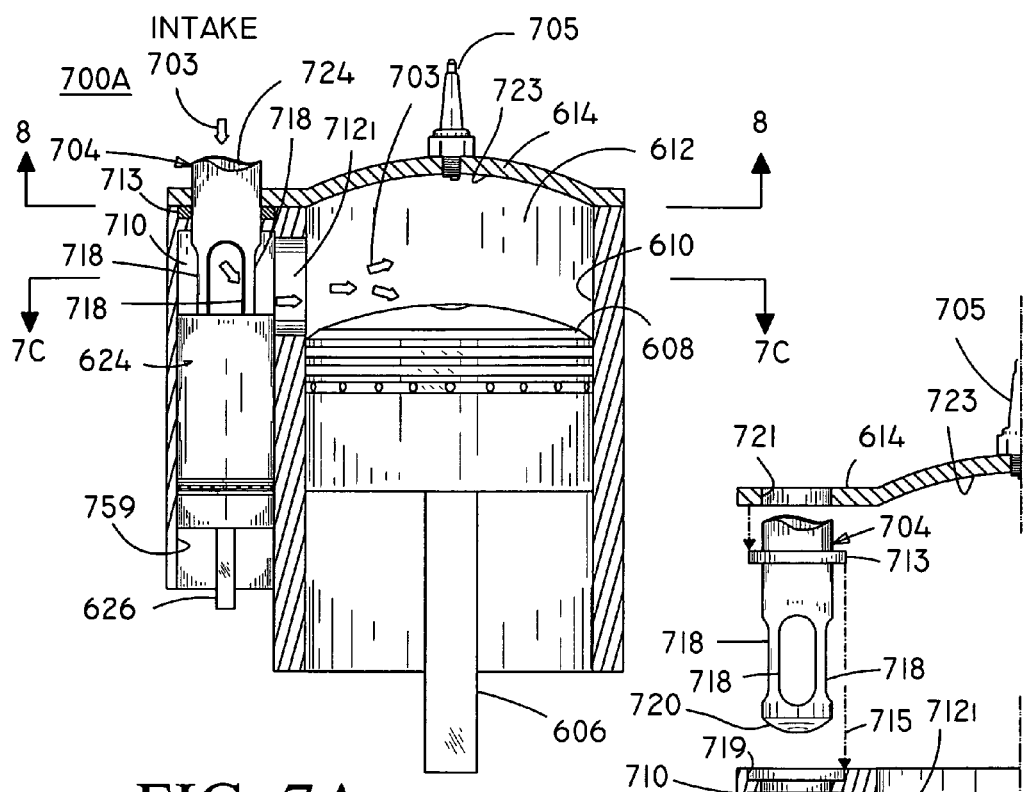
FIG. 7A is a cross-sectional view illustration of an individual cylinder and intake valve taken along line 7A-7A of FIG. 6B.

A cross sectional view illustration of an individual cylinder with an intake valve taken along line 7A-7A of FIG. 6B is shown in FIG. 7A. The valve body 624 is reciprocally (i.e., slidably) located within an internal passage 710 of a guide sleeve 702. As shown, the guide sleeve 702 (or parts thereof) can be formed integrally with a cylinder block. However, it is also envisioned that the guide sleeve 702 can be formed, at least in part, integrally with a cylinder head (e.g., 614) or other engine parts, and/or or may be a separate unit in its entirety. An open port hole 712I of the guide sleeve 702 is flow connected to the combustion chamber 612. A spark plug 705 is (for example, centrally) located in a spark plug hole 707 and is positioned, for example, directly over the piston 608 for illustration. However, the spark plug or plugs can also be located in other locations, as desired. An internal open port valve guide 704 includes open port holes 718 and an opening 724 flow connected to each other via an internal passage (not shown—e.g., see, 116, FIG. 1). The intake valve apparatus is shown in a partially open position and intake flow is entering the combustion chamber 612 is depicted by arrows 703. This flow enters through the opening 724, travels through the internal passage of the valve guide 704, and exits the valve guide 704 through the open port holes 718 into the internal passage 710, and thereafter flows though the open port hole 712 and enters the combustion chamber 612. The gas-flow path for an exhaust flow is the opposite of the intake flow, when using the valve apparatus that is similar to that which is depicted in FIG. 1A.

Figure 7B:
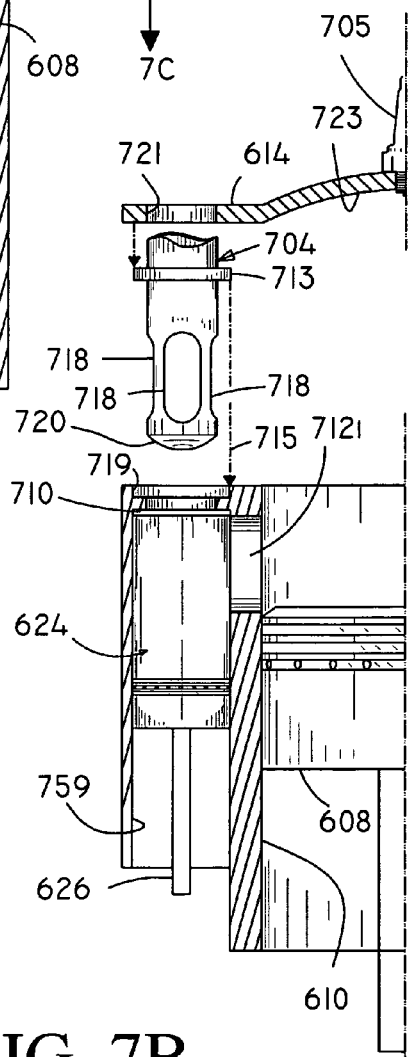
FIG. 7B is a partially exploded cross-sectional view illustration of the cylinder and the intake valve shown in FIG. 7A.

A partially exploded cross sectional view illustration of the cylinder intake valve shown in FIG. 7A, is shown in FIG. 7B. The valve guide 704 includes a flange 713 which fits within the cutout 719 and is held in place by, for example, the cylinder head 614. Accordingly, the internal open port valve guide 704 can be easily removed for service (e.g., cleaning and/or replacement). Passages 715I and 715E correspond with intake and exhaust valves, respectively, and hold the optional flange 713 in position such that the corresponding valve guide 704 is securely held in place. Thus, for example, the holes (e.g., 122A, 123) may not be required to hold a corresponding valve guide in position. Thus, the valve guides 704 may be secured by the cylinder head 614. However, it is also envisioned that the valve guides 704 may be inserted through the cylinder head and held using other methods (e.g., a weld, a threaded connection such as a stud, bolts, etc.). A dome area (or other shaped area) 723 can be used to define at least part of a combustion area which can be shaped and sized so as to enhance operating gas flow in a corresponding cylinder during use.

Figure 7C:
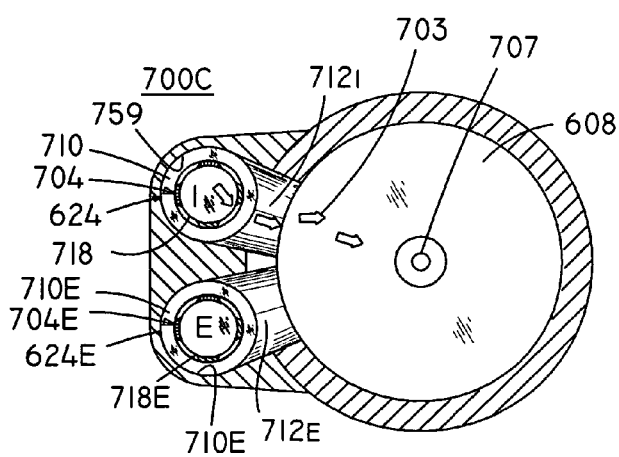
FIG. 7C is a planar view illustration of the cylinder and the intake valve taken along line 7C-7C of FIG. 7A.

A cross sectional view illustration of an individual cylinder with an intake valve taken along line 7C-7C of FIG. 7A is shown in FIG. 7C. An exhaust valve apparatus is similar to the intake valve apparatus; accordingly, like parts are denoted using an "E" suffix.

Figure 8:
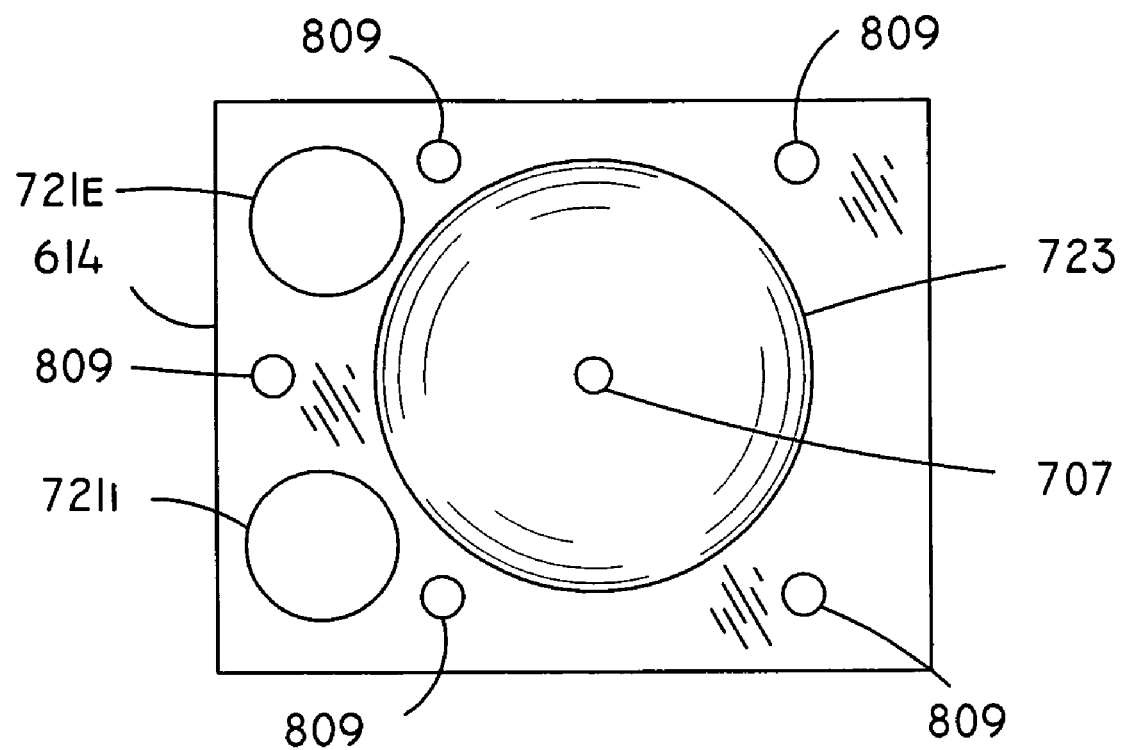
FIG. 8 is a planar view illustration of the cylinder head shown in FIG. 7A taken along lines 8-8 of FIG. 7A.

A planar view illustration of the cylinder head shown in FIG. 7A taken along lines 8-8 of FIG. 7A is shown in FIG. 8. Bolt holes 809 are for illustration and can be used for securing the cylinder head 614 to the engine block. Although not shown, gaskets, washers, and/or other sealing devices may be used to properly position and seal the various parts of the present invention. Further, it is also envisioned that the cylinder head can be formed integrally with the engine block, if desired.

Figure 9C:
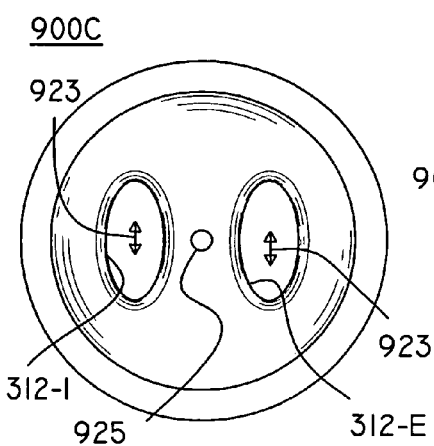
FIG. 9C is a cross-sectional view illustration of a cylinder head valve taken along line 9C-9C of FIG. 9B.
Figure 9A:
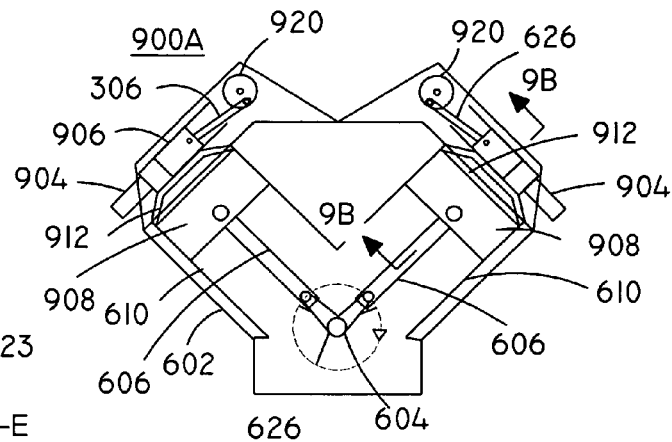
FIG. 9A is a block diagram illustrating a front view of the valve apparatus of the present invention installed in a overhead valve configuration of a v-type engine configuration.

A block diagram illustrating a front view of the valve apparatus of the present invention installed in a overhead valve configuration of a V-type engine configuration is shown in FIG. 9A. The engine 900A is similar to the engine shown in FIG. 6A; however, the engine 900A has an overhead valve configuration and two valve operation mechanisms such as, for example, valve crankshafts 920. With reference to FIG. 9A, engine 900A includes a hemispherical combustion chamber 912, and pistons 908 which have a corresponding crown shape, and a guide sleeve 904. Each of valve crankshafts 920 is coupled to a valve connecting rod 626 which is in turn coupled to a corresponding valve body 306 for imparting a reciprocating force thereto. The valve operating mechanisms 920 are coupled to the crankshaft 604 using any suitable method, such as, for example, a timing belt, chain, etc.

Figure 9B:
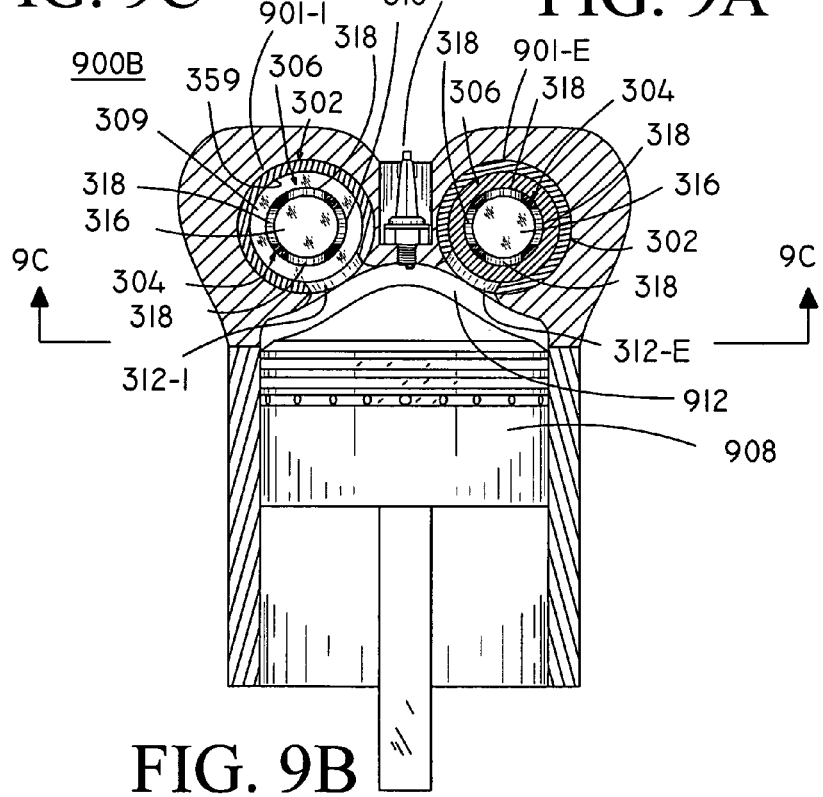
FIG. 9B is a cross-sectional view illustration of an individual cylinder with an intake valve taken along line 9B-9B of FIG. 9A.

A cross-sectional view illustration of an individual cylinder with an intake valve taken along line 9B-9B of FIG. 9A is shown in FIG. 9B. As shown, cylinder 901 has two valves according to the present invention, i.e., an intake valve 901-I (where "I" denotes an intake configuration) and an exhaust valve 901-E (where "E" denotes an exhaust configuration) which are shown in an open and closed gas flow configuration, respectively. As the intake and exhaust valves 900-I and 900E, respectively, are similar to those which are shown in, for example, FIGS. 5A and 5B, respectively, they are correspondingly numbered. Accordingly, for the sake of simplicity, a further description thereof will not be given.

A cross-sectional view illustration of a cylinder head taken along line 9C-9C of FIG. 9B, is shown in FIG. 9C. Cylinder head 900C includes an open port hole 312-I for an intake (gas) flow and an open port hole 312-E for an exhaust (gas) flow. Arrows 923 indicate a direction of motion of the valve body 306 of each corresponding valve apparatus. A spark plug 925 can be centrally disposed. Although oval open port holes 312-1 and 312-E are shown, either or both of these open port holes may have another shape such as, for example, round, square, triangular, etc. Further a plurality of open port holes can be used can be used, if desired. For example, the open port holes of various shapes and sizes (e.g., circular, oval, etc.) may be associated with each valve, if desired. Further, it is also envisioned that each cylinder may have a plurality of intake and/or exhaust valves so as to form a multi-valve (e.g., 2-, 3-, 4-, 5) valve cylinder configuration. Moreover, with regard to the shape of the cylinder head 900C, it may be shaped and sized such that it covers an individual cylinder of an engine or two or more cylinders (e.g., four cylinders in a bank of an eight-cylinder engine), as desired. Further, it is also envisioned that the cylinder heads of the present invention may cover both banks of a v-type engine, if desired.

Figure 10:
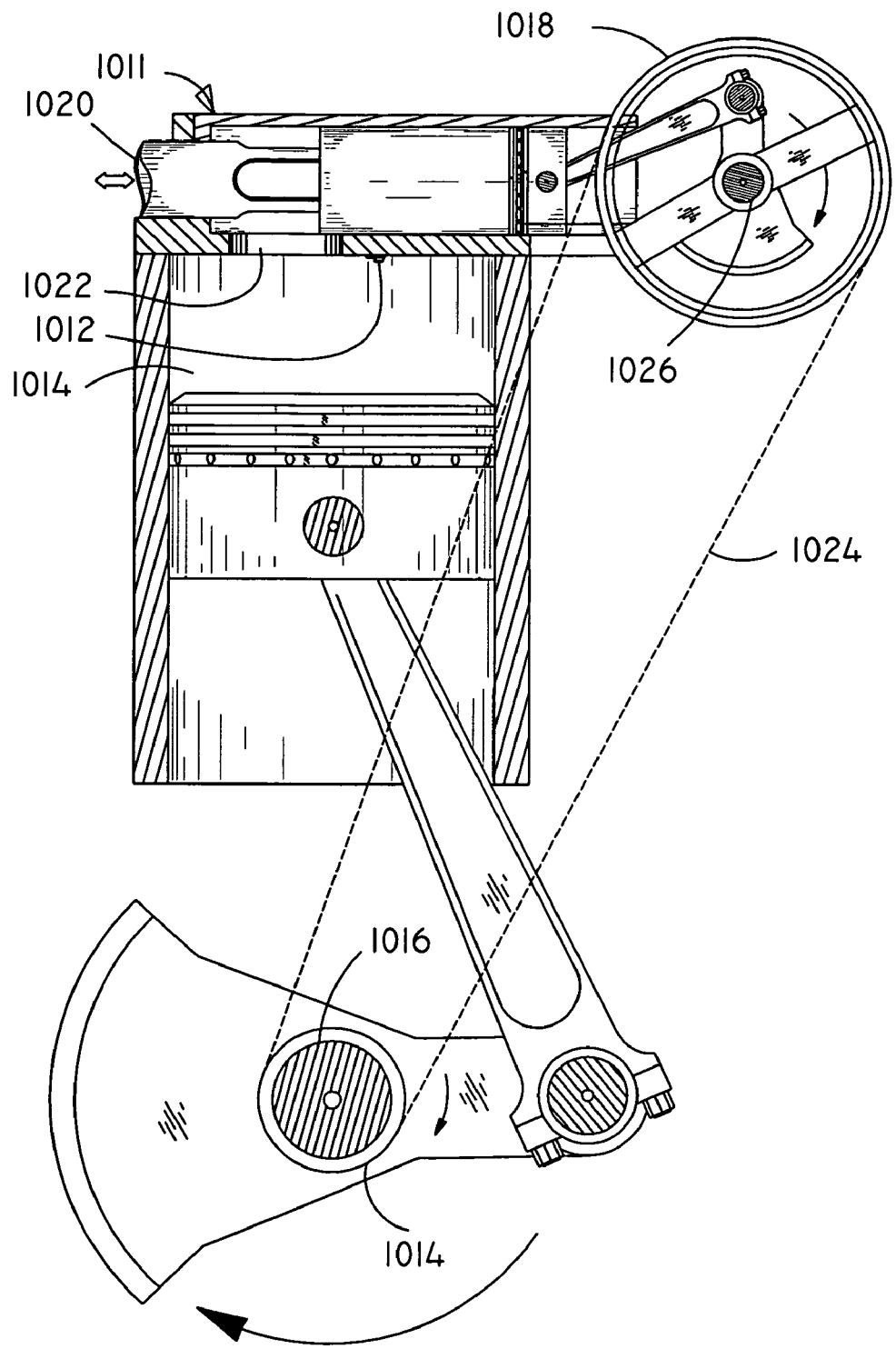
FIG. 10 is a partial cross-sectional view illustrating an overhead valve configuration according to the present invention.

A partial cross-sectional view illustrating an overhead valve configuration according to the present invention is shown in FIG. 10. Valve apparatus 1011 is similar to the valve apparatus shown in FIG. 1A and includes an open port hole 1022 and an opening 1020 which are selectively flow connected with each other (e.g., when the valve apparatus is in an open position as shown). Accordingly, cylinder 1014 can receive an intake gas charge (including air and/or fuel) via the opening 1020 and the open port hole 1022 during an intake cycle and can exhaust combustion (e.g., burnt) gasses during an exhaust cycle via the open port hole 1022 and the opening 1020. A single spark plug 1012 is shown for illustration. Further, a valve drive apparatus including a timing belt (or chain) 1024 is shown coupling a crank sprocket 1014 (coupled to crankshaft 1016) to a valve gear sprocket 1018. As shown, the valve gear sprocket 1018 is twice the diameter of the crank sprocket 1014. Accordingly, the valve gear sprocket 1018 (which turns a valve crank shaft 1026) spins at half the speed of the crank sprocket 1014 thus ensuring proper valve timing.

Although not shown, the combustion chambers of the present invention may include chambers such as a pre-combustion chamber, a turbulence chamber, etc., as desired. These chambers can be desirable when the present invention is used in a diesel-type engine. Further, a fuel injector, not shown, may be incorporated into the valve apparatus of the present invention so as to provide a fuel charge to an associated cylinder. Further, it is also envisioned that a direct-injector-type fuel injector may be associated with the combustion chamber of the internal combustion reciprocating engine.

Thus, according to the present invention, a valve system which can reduce vibration, noise and/or exhaust pollution levels and/or increase the efficiency of an internal combustion engine is disclosed.

Certain additional advantages and features of this invention may be apparent to those skilled in the art upon studying the disclosure, or may be experienced by persons employing the novel system and method of the present invention, chief of which are that noise and other environmental pollution can be reduced.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

What is claimed is:

1. A valve apparatus (100) for an internal combustion engine having a combustion chamber (612) in which a fuel mixture is combusted as well as an intake port (712I) coupled to an intake manifold and an exhaust port (712E) coupled to an exhaust manifold, the valve apparatus (100) comprising:
    a valve sleeve (102) having a wall section (103) defining at least part of a valve cavity (110) that extends along a longitudinal length of the valve sleeve (102), and an opening (112) located through the wall section (103) of the valve sleeve (102) and which communicates with the combustion chamber (612);
    a tubular, movable valve body (106) configured and arranged to be reciprocally-located and movable within at least part of the valve cavity (110) and defining an inner longitudinally-extending passage (134);
    a valve guide (104) coupled to the valve sleeve (102) and having a first end (125) situated outside the valve cavity (110), and a second end (120) situated within the inner passage (134) of the valve body (106), the valve guide (104) having an inner passage (116) located and extending between the first (126) and second (120) ends, a first opening (124) located at the first end (126) and in flow communication with the manifold, and one or more openings (118) through a wall section thereof to communicate the inner passage (116) with the valve cavity (110); and
    means (390) for reciprocally moving the valve body (106) relative to both the valve sleeve (102) and valve guide (104) such that
    in fully closed position, the valve body (106) extends into the valve sleeve (102) and covers the openings (118) in the valve guide (102),
    in fully open position, the valve body (106) is retracted away from the valve guide (104) within the valve sleeve (102) and uncovers the openings (118) in the valve guide (104), and
    in partially open or closed position, the valve body (106) partially covers the openings in the valve guide (104) within the valve sleeve (102).

2. A valve apparatus (400) for an internal combustion engine having a combustion chamber (612) in which a fuel mixture is combusted as well as an intake port (712I) coupled to an intake manifold and an exhaust port (712E) coupled to an exhaust manifold, the valve apparatus (400) comprising:
    a valve sleeve (402) having a wall section defining at least part of a valve cavity (410) that extends along a longitudinal length of the valve sleeve (402), and an opening (412) located through the wall section of the valve sleeve (402) and which communicates with the combustion chamber (612);
    a movable valve body (406) configured and arranged to be reciprocally-located and movable within at least part of the valve cavity (410);
    a valve guide (468) coupled to the valve body (406) and having a first end situated outside the valve cavity (410), and a second end situated within the valve cavity (410) and adjacent the valve body (406), the valve guide (468) having an inner passage (416) located and extending between the first and second ends, a first opening (417) located at the first end and in flow communication with one of the intake (712I) or exhaust (712E) ports, and one or more openings (418) through a wall section thereof proximate the second end thereof to communicate the inner passage (416) with the valve cavity (410); and
    means (490) for reciprocally moving both the valve body (406) and valve guide (468) relative to the valve sleeve (402) such that
    in fully closed position, the valve body (406) extends into the valve sleeve (402) and the valve guide (468) is pushed to extend outside the valve sleeve (402) with the openings (418) being situated outside the valve cavity (410),
    in fully open position, both the valve body (406) and valve guide (468) are retracted into the valve sleeve (402) such that the openings (418) in the valve guide (468) communicate with the valve cavity (410), and
    in partially open or closed position, the valve guide (468) extends outside the valve sleeve (402) with the openings (418) in the valve guide (468) also extending partially outside the valve cavity (410).

3. The apparatus of claim 1, wherein said means (390) comprises
    a shaft (381) coupled to a crankshaft of the engine, and
    a connecting part (372) having first and second ends, the first end (376) coupled to the shaft (381) and the second end (370) coupled to the valve body (306), such that displacement of the connecting part (372) causes the valve body (306) to reciprocate relative to both the valve sleeve (302) and guide (304).

4. The apparatus of claim 2, wherein said means (490) comprises
    a shaft (381) coupled to a crankshaft of the engine, and
    a connecting part (372) having first and second ends, the first end (376) coupled to the shaft (381) and the second end (370) coupled to the valve body (406), such that displacement of the connecting part (372) causes both the valve body (406) and guide (468) to reciprocate relative to the valve sleeve (402).

5. The apparatus of claim 1, wherein the shaft (381) comprises a cam shaft or a valve crankshaft.

6. The apparatus of claim 2, wherein the shaft (381) comprises a cam shaft or a valve crankshaft.

7. The apparatus of claim 1, additionally comprising
    a first sealing part (158) located between an outer wall of the valve body (106) and inner wall of the valve sleeve (102) to restrict flow along the respective inner and outer walls, and
    a second sealing part (156) situated within the inner passage (134) of the valve body (106) to slidably engage the wall section of the valve guide (104) and restrict flow along the respective inner passage (134) and wall section.

8. The apparatus of claim 2, additionally comprising
    a first sealing part (358) located between an outer wall of the valve body (406) and inner wall of the valve sleeve (402) to restrict flow along the respective inner and outer walls, and a second sealing part (404) situated along the inner wall of the valve sleeve (402) to slidably engage the valve guide (468).

9. The apparatus of claim 7, wherein the first or second sealing parts (158, 156) comprise a plurality of sealing rings.

10. The apparatus of claim 8, wherein the first or second sealing parts (358, 404) comprise a plurality of sealing rings.

11. The apparatus of claim 9, further comprising a passage (146) arranged through the valve body (106) for passing lubricating fluid to or from the inner wall of the valve sleeve (102).

12. The apparatus of claim 10, further comprising a passage (146) arranged through the valve body (106) for passing lubricating fluid to or from the inner wall of the valve sleeve (102).

13. The apparatus of claim 1, situated as an intake valve between the intake manifold and combustion chamber (612) to selectively communicate the intake manifold with the combustion chamber (612).

14. The apparatus of claim 2, situated as an exhaust valve between the exhaust manifold and combustion chamber (612) to selectively communicate the exhaust manifold with the combustion chamber (612).

15. The apparatus of claim 1, wherein at least part of the valve sleeve (102) is formed integrally with a cylinder head, such that the opening (112) through the wall section (103) of the valve sleeve (102) is situated in the cylinder head.

16. The apparatus of claim 2, wherein at least part of the valve sleeve (402) is formed integrally with a cylinder head, such that the opening (412) through the wall of the section of the valve sleeve (402) is situated in the cylinder head.

* * * * *